Sept. 5, 1950     W. C. STARKEY ET AL     2,521,670
CLUTCH SPRING
Filed Dec. 5, 1945
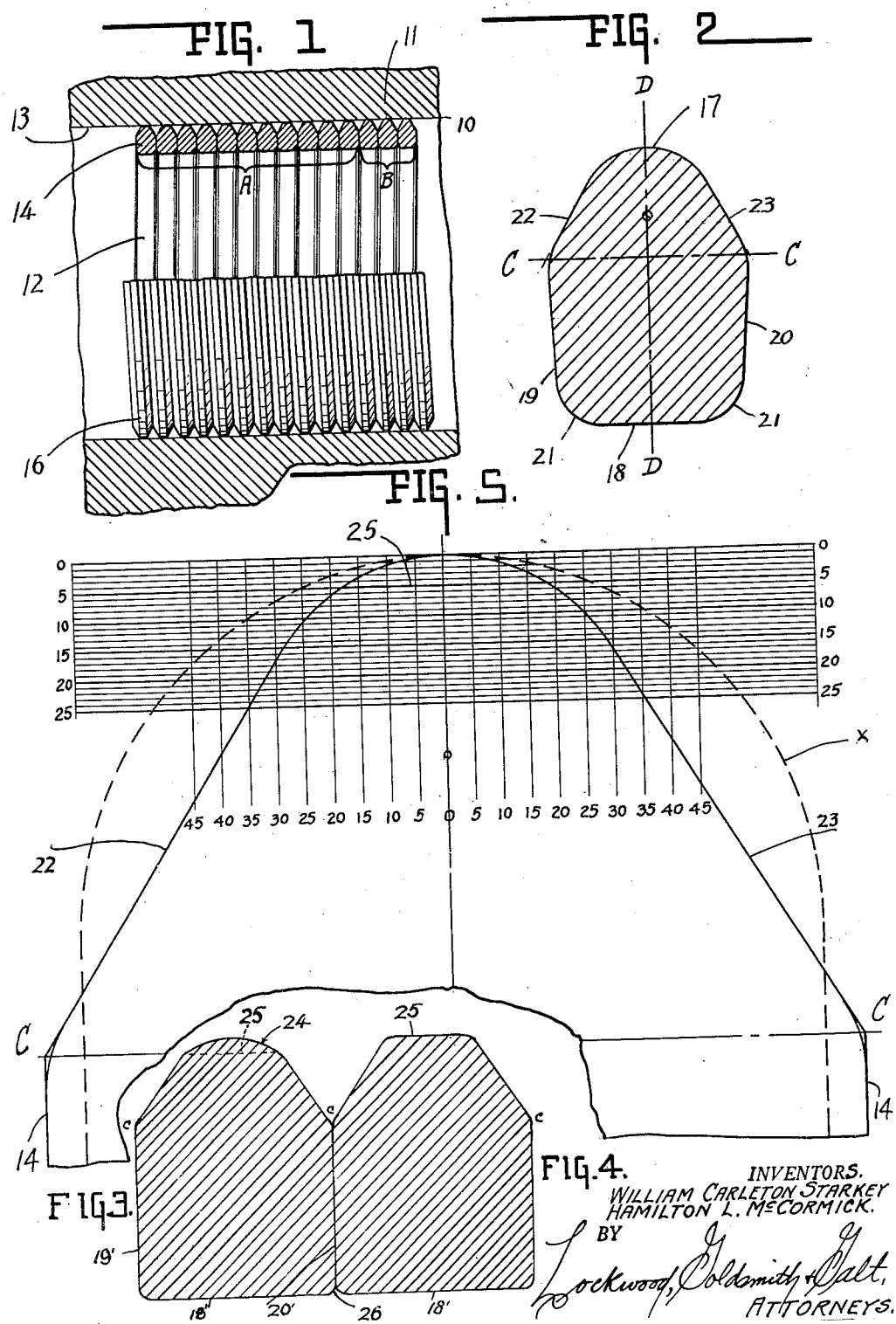

Patented Sept. 5, 1950

2,521,670

UNITED STATES PATENT OFFICE 2,521,670

CLUTCH SPRING

William Carleton Starkey, Indianapolis, and Hamilton L. McCormick, Carmel, Ind., assignors to Fletcher Trust Company, Indianapolis, Ind., a corporation, as trustee Application December 5, 1945, Serial No. 632,986

11 Claims. (Cl. 192—41)

This invention relates to a clutch element of the coiled wire type for use in a friction clutch of the kind usually referred to as a spring clutch.

The principal objects are to provide an improved shape of wire stock for making coiled clutch springs and, as an article of manufacture, an improved friction clutch element of the coiled wire type.

Specific objects include the making of clutch spring wire stock of such cross sectional shape that (a) it can be rolled or drawn in high quantity production with a practical minimum of destructive wear and strain on the necessary dies or tools, (b) it will, when coiled by the usual methods, result in a clutch spring having its principal masses so distributed as practically ideally to resist the complicated strains and shocks incident to service as a clutch spring, whether designed to expand-to-clutch or contract-to-clutch, and (c) the resulting coil may be finished, as by simple centerless or center grinding, to remove scale and surface irregularities while providing (economically from the standpoint of manufacturing cost) clutching land areas of appropriate and controllable extent axially of the coils, having regard particularly to the special service to be rendered by respectively different portions of the clutching land surface as will be later explained more fully herein although well known in the art.

The spring stock hereby disclosed as drawn or rolled (Fig. 2 later described), has, in cross section, a principal or longitudinal medial plane D—D establishing a main dimension; a transverse plane C—C establishing a shorter or minor dimension; the bulk of the stock is disposed symmetrically about the principal plane and on the side of the transverse plane which is to become the non-clutching peripheral portion of the coil in the finished spring, and a lesser amount or portion of stock on the opposite side of the transverse shorter dimension plane and symmetrically distributed about the principal plane. The lesser bulk clutching portion, with the shorter dimension as a base, is preferably, roughly, of regular trapezoidal shape and with sides converging away from the base at a comparatively wide included angle (e. g. 60 degrees) joined by a crown portion which, in the rolled or drawn stock, is preferably a regularly curved surface formed on or defined by a radius having its center located within the trapezoidal area and along the principal plane, so that the curve is tangent to the converging sides. The curved surface portion is circularly (e. g. cylindrically) finished to form the clutching face of the spring and, if generated as indicated, it and the converging sides are easy to form by dies or rolls (no abrupt deviations or sharp corners) to present to the land-forming grinding or finishing tools a region which, within practical limits (allowing for production manufacturing tolerances), may be finished with controlled narrow width at one end of the spring (energizing end) and to increase gradiently in width (or abruptly if desired) toward the opposite or load carrying end of the spring. Thus the energizer or teaser coil or coils has or have narrow clutching land surface portions for cutting through obstinate oil films (as at sub-zero temperatures) and the balance of the coils have, or may have, as will be presently explained, gradually increasing width, to withstand the gradually but rapidly increased pressures from coil to coil incident to efficient clutch spring use as is well known in the art. Concomitantly, by provision of the converging sides mentioned, V-shaped grooves are formed which decrease in depth and "cross sectional" area from the energizing end or spring portion where large lubricant-reception spaces are desirable, toward the load carrying end or toward the region of the clutch where it becomes increasingly desirable to retain lubricant between the coacting clutch surfaces in order to prevent galling or scoring.

The non-clutching portion of the drawn or rolled stock, at the side opposite the transverse or short dimension plane mentioned, is also preferably roughly of regular trapezoidal form being of known slight wedge or keystone shape so that as the stock is coiled the portion which becomes subjected mainly to compressive strain (toward the coil axis) increases in width (axially of the coil) and the opposite side which is subjected mainly to tensional strain decreases in width. Additionally, partly to avoid sudden change in direction on part of the wire-forming die or roll surfaces—hence to minimize wear and strain on the tools and thereby produce smoother spring surfaces—the paired slightly converging sides of the stock merge in generous curves into the connecting side which later becomes or establishes the non-clutching peripheral face of the finished spring. In the finished spring metal flow due principally to the compressive strains and heat generated by coiling of the stock tends to eliminate the curves and will eliminate them if properly proportioned in relation to the stock section as a whole.

In a spring which is designed to contract in clutching (not shown) the slightly converging or keystone-face sides would, obviously, converge toward the clutching faces rather than away therefrom as in the illustrated embodiment.

In order to produce finished (e. g. ground) clutching lands which increase gradiently in width in a direction from the energizing toward the load-carrying end of the spring either of two methods or appropriate variations thereof can be used. For illustration, in the case of an expanding-to-clutch type of spring the stock can be partly or wholly taper-wound; then expanded on a cylindrical mandrel leaving the clutching surface region exposed, and that surface then subjected to cylindrical grinding. When the spring is removed from the mandrel its restored normal shape results in provision of larger teaser coil diameters with narrow lands, effective to remain engaged during overrun of the clutch with the coacting clutch surface, and gradiently increasing widths of land and smaller diameters at or toward the load carrying coils which would be finished normally to fit or slightly clear the coacting clutch surface, as desired. The other method, which is the reverse of the above, is to form the coils cylindrically; then expand the coiled blank onto a tapered or flared mandrel and then to grind the clutching periphery cylindrically. When the mandrel is removed the spring assumes its original shape, and has wide lands and relatively smaller diameters at or toward the load carrying end and narrowing lands and increasing diameters at or toward the energizer or teaser end. Usually the difference in diameter on part of the different portions of the mandrel (or of the different coils if taper-wound) is on the order of a few thousandths of an inch, wherefore the radially somewhat thicker energizer coils are nevertheless adequately flexible.

If the clutch spring is of the contracting-to-clutch type it would, if coiled as a cylinder, be contracted into a tubular (e. g. flared or slightly tapered) mandrel and ground on its inside face; the more contracted, hence eventually larger diameter, coils being ground off to a greater extent as would be appropriate for service as load-carrying coils in that type of clutch. The above discussion indicates further objects of the invention.

A further important object is to provide a form of stock material so contoured in its cross sectional configuration that when wrapped into its helical form to its preset radius it will provide a spring clutch which can be so wound as to be approximately solid from end to end considered axially and approximately solid from its mean or pitch diameter to its non-clutching surface considered radially, which will provide the desired lubricant receiving and retaining channels in its clutch surface and in which its predetermined width of land will be controllable under practical production conditions wherein, as usual, the spring stock is ground to fit its companion diameter and for removal of scale and surface irregularities, and wherein the increase in land width imposed by such grinding is at a much less rate than is the rate of grinding of the surfaces.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

In the accompanying drawings:

Fig. 1 is a view partly in axial section and partly in side elevation of a spring clutch constituting a preferred embodiment of the invention;

Fig. 2 is an enlarged cross sectional view showing in full lines the outline of the wire stock from which the coils of Fig. 1 are eventually formed and showing certain of its relative dimensions.

Figs. 3 and 4 are each enlarged cross sectional views of any two of the adjacent coils of Fig. 1; Fig. 3 showing in full lines the configuration developed from that of Fig. 2 when the stock is wound into its cylindrical form before grinding; Fig. 4 showing the cross section of the finished and ground form of coil shown in Fig. 1; and Fig. 5 is a schematic comparative illustration plotted to indicate the relative measurements in grinding the wound coil spring to the desired diameter and to the final width of land.

There has been selected for specific discussion a clutch 10, Fig. 1, which comprises an outer member 11 provided with a cylindrical bore defining a clutch surface 13, in which bore is fitted an externally gripping or expanding type clutch spring 14. The clutch spring is wound to provide a series of abutting coils 12 and has its outer perimeter ground to provide a clutching land surface 16 of proper diameter to operate within the bore 13, different portions of the spring preferably having different fitting or cooperating relationships to the bore.

The main body of the spring comprises at one end a large number of coils, which may be referred to as the load carrying coils, indicated by the group included in the bracket A and at the other end comprises one or more exciter or energizer coils grouped within the bracket B. In grinding the coils to their requisite diameters the coils embraced by the bracket B are ground slightly oversize compared to the diameter of the coils grouped within the bracket A.

In forming any particular spring coil that size of stock material is selected which will best respond to the required size of clutch desired, giving due consideration to the work for which the clutch is intended as above outlined. Referring to one representative specimen of this stock material as shown in Fig. 2 (expanding-to-clutch type) it will be noted that, as drawn or rolled, it is generally of bi-symmetrical polygonal form in cross section, having five flat sides and a curved side 17 which in the finished spring is usually desired to be ground straight to form the peripheral clutch surface or land. The stock material as drawn or rolled has its greatest width (minor dimension discussed above) indicated by the line C—C nearer to the side (top) which is to form the clutching surface or land than it is to the opposite or non-clutching (bottom) side 18, so that as much material as practically possible is, in the finished spring, massed between the line C—C and the non-clutching side. As viewed in Fig. 2 the cross section is symmetrical about a medial vertical line D—D (principal plane) which bisects the sides 17—18. From this line C—C the width is gradually reduced both upwardly and downwardly as viewed in Fig. 2 so that the opposite pairs of sides converge towards the medial line D—D. The opposite long paired sides 19—20 (see Fig. 2) converge slightly towards each other and merge into the side 18 in generous identical curves 21. The sides 19 and 20 are almost but not quite parallel to the medial line D—D. In actual practice, as previously outlined, the angle of divergence of the sides 19 and 20 is selected to bring these sides almost if not entirely into exact parallelism so that in the final wrapped form, see Fig. 3, the resulting sides 19' and 20' of adjacent coils may contact in a face to face relation over a material area and substantially from the line C—C to the final nonclutching surface 18'. In the illustrated instance the angle formed between each side 19 or 20 and a perpendicular to the adjacent end of the line C—C is about three degrees.

The opposite paired relatively short sides 22 and 23 which lead to the end which is to form the clutch surface converge from the line C—C to the medial line D—D and each side forms an angle of about sixty degrees with the line C—C. Thus if the lines 22 and 23 were extended they would form an included angle of sixty degrees. These sides 22 and 23, in the illustrated form, are tangent to a relatively short arc of a circle forming or defining the curved side 17 which is to be ground as hereinafter described.

Many springs which have functioned satisfactorily under conditions herein described have been found to possess approximately the same relative dimensions. In these several cases the height of cross section of material in each coil as measured along the medial line D—D Fig. 2 will be referred to as the distance $h$ which distance is used herein to provide a basis for comparison with the other dimensions of the cross section. The line C—C which defines the maximum width has a length about seventy per cent of the height $h$ so that the cross section has greater depth along the line D—D than the width measured along the line C—C. This line C—C is located nearer the crown portion of the end 17 than the surface 18 so that the bulk of material lies between the line C—C and the side 18. In the form illustrated the distance between the line C—C and the crown of the end 17 is about forty per cent of the distance $h$. The diameter of the circle whose arc may form the curve 17 is about twenty per cent of the distance $h$ so that its center is beyond the line C—C from side 18. The external diameter of the coils bracketed by A, and which is also the internal diameter of the bore 13 with which they are designed to coact as a clutch, is approximately nine and one-half times the distance $h$.

The stock wire of the peculiar cross sectional form above described and illustrated in Fig. 2 is wound into a spiral coil following conventional practices in this respect. As the result of this winding each coil takes the form shown in cross section in Fig. 3. Comparing the showing in Fig. 2 with that in Fig. 3 it is seen that the width along the base side 18 has broadened slightly to a new width 18', so that the area bounded by the sides 20', 18', 19' and the line C—C forms a rectangular shape more closely approaching a square than when in the initial form shown in Fig. 2.

Considering the cross section above the line C—C it will be found that it is of somewhat narrower width than its original Fig. 2 form and incidentally somewhat flatter. In Fig. 3 the arc 17 more nearly approaches a flat surface as indicated at 24 and thus more nearly approaching the final flat ground surface or land indicated by the dotted line 25 in Fig. 3 and full line in Fig. 4. Incidentally this wrapping operation reduces the curvature of the rounded edges 21 so that in the final form the inner perimeter of the clutch spring is continuous from end to end except for the presence of a spiral channel 26 of extremely small cross section, and which from an ideal standpoint should be non-existent. Considering Fig. 4 then it can be assumed that the portion below the line C—C is rectangular and the part above the line C—C forms the frustum of a regular trapezoid in cross section. It is appreciated that in arriving at the dimensions for the stock wire shown in Fig. 2, the operation was worked backwards starting with the desired final configuration shown in Fig. 4 and figuring the distortions which would develop in the stock incidental both to the winding operation and to any necessary grinding after the desired width of land had been ascertained. It is required in the finished structure that the clutch surface be formed as an accurately ground or otherwise finished body of circular cross section and this means that each coil has its curved surface 24 ground to a surface shown in Fig. 4 as a flat line 25 forming a chord of the circle whose arc is approximately the same as of originally formed surface 17. In designing the dimensions of the stock material shown in Fig. 2 due consideration was given to what was to become the final overall radial dimensions of the spring in its relation to the diameter of the bore 12 and the width of the line 25. In general this means that in winding the stock spring into the form shown in cross section in Fig. 3 the diameter of the winding should be slightly oversize so that when ground down to the proper final diameter as demonstrated by Fig. 4 the preset dimensions of the lands 25 will be appropriate for clutching.

In Fig. 4 the upper portion of the wire section is laid out upon a vertical scale in thousandths of an inch to indicate the extent of grinding of its clutch surface. The horizontally arranged scale, in thousandths of an inch, is indicative of the width of the land resulting from the grinding to diameter. Considering successive unit distances along the vertical ordinate of the chart and comparing such distances with succeeding widths of lands it will be seen that while grinding inwardly succeeding unit distances increases the widths of the lands, each succeeding increment of increased width is less than said unit distance of depth of grinding. For example, if the spring is to be ground to vary its diameter by .010 of an inch, each section of spring, as shown in Fig. 5, will be ground .005 of an inch which will form a land 25 having a width of .035. Varying the diameter of the spring another .010 (grinding such section .005) would increase the width of the land to .048. An additional .010 relief would increase the land to .058 and a further .010 relief would increase it to .064.

Width of the land will, therefore, be maintained at a minimum of variation during the grinding operation. As compared with a wire having the usual curved or arcuate cross section indicated by dotted lines at X, the width of the land of the above described section increases or varies much less rapidly with the grinding of the clutch surface. Thus, a section has been developed which lends itself to more ready control of the width of the land in surface grinding of the spring to size. This has the advantage of permitting the same wire to be wound into a spring clutch having a wide range of clutch surface diameters; and wherein the processing of the spring will permit of substantial variations of diameter in the grinding operation, even in a single spring, while holding the land width within prescribed tolerances.

As previously explained, in winding the clutch spring, or preparing the spring for grinding, different coils will usually vary somewhat from each other in diameter, so that in grinding the clutch surface there will be an automatically established deeper grind on some coils than on others (e. g. coils A in comparison to coils B, Fig. 1). By means of the form of spring section herein explained, such variations in depth of grind will still leave the widths of the lands within the required tolerances and of such character that each spring portion best serves its required function.

From the foregoing, it will be observed that within limits and permissible quantity production tolerances, many varying factors may be controlled. With the prescribed width and depth of the body portion of the wire section such as may be required to provide the desired tensile and/or compressive strength, (a) variations in diameter of the coils can be accurately controlled, (b) the spring may be ground to the proper diameter or diameters of clutch surface, and (c) the width or gradiently varying widths of the land may be held and controlled within practicable, permissible tolerances.

We claim:

1. A tubular clutch spring formed of a series of wire coils fashioned to provide a clutch surface of substantially cylindrical form, the wire of which the coils are formed being approximately six sided and having its greater width nearer the clutch surface than the opposite surface, the cross section of the wire in the portion thereof between the line defining its greatest width and a line defining its clutch surface being in the form of a regular trapezoid and the cross section of the wire in the portion thereof between the said line and the line defining said opposite surface being substantially rectangular.

2. A clutch spring of tubular form comprising a series of coils, said spring having load carrying coils at one end and energizing coils at the other, said spring being formed at the clutching periphery with gradiently increased diameter and gradiently decreasing clutching land surface width in a direcLon from the load carrying end of the spring toward the energizing end.

3. As an article of manufacture, a clutch spring of tubular form comprising a series of coils wound from stock of uniform cross section to maintain a uniform helix, said spring having a load carrying end and an energizing end, each coil having a clutching surface lying between side wall surface portions of the stock which converge at a relatively wide angle toward the clutching surface, said clutching surface or part thereof having substantially cylindrical clutching lands which gradiently increase in width in a direction from the energizing end of said spring toward the load carrying end thereof.

4. A clutch spring of tubular form comprising a series of coils, said spring having a load carrying end and an energizing end, each of said coils being formed with a clutching land surface, the portions of the coils bearing the clutching land surface being spaced apart to form a helical channel surrounding the spring, said channel gradiently increasing in depth radially of the coils and the clutching land surface gradiently decreasing in width axially of the coils in a direction from the load carrying toward the energizing end of said spring.

5. A clutch spring of tubular form comprising a series of coils, the spring having a load carrying end and an energizing end, one peripheral face portion of the spring forming a clutching surface with successive turns spaced apart axially of the spring to provide a helical channel thereabout, the side portions of said coils extending approximately in face to face engagement, the clutching face portions of the coils gradiently increasing in diameter and decreasing in width in a direction from the load carrying end of said spring toward the energizing end thereof, and the radial depth of the channel gradiently increasing in said direction.

6. As an article of manufacture, a spring clutch element comprising a coiled, drawn or rolled, wire having mutually adjacent approximately parallel side faces and oppositely disposed converging side faces adjacent the peripherally exposed portion of the element which is to serve as the clutching surface portion, the wire, as drawn or rolled, having a cross sectional dimension radially of the coil greater than the cross sectional dimension axially of the coil, and having a relatively narrow clutching-land surface as compared to the radial breadth of the mutually adjacent face surfaces and the maximum axial dimension of the individual coils, which clutching-land surface increases in width toward one end of the coil.

7. As an article of manufacture, a coiled, drawn or rolled wire adapted to serve as a friction clutch element, the wire as formed and coiled having a greater cross sectional dimension radially of the coils than axially thereof, the coils having approximately parallel mutually adjacent faces, radially exposed intermediate approximately cylindrical non-clutching faces and radially exposed intermediate clutching faces opposite the non-clutching faces, said clutching faces being materially narrower axially of the coils than the mutually adjacent and non-clutching faces.

8. The article according to claim 7 wherein the clutching faces vary in width axially of the coils to provide larger clutching land area per lineal unit of wire toward the end of the clutch element which, in operation of the clutch, transmits greater clutching pressure per unit of clutch engaging surface.

9. As an article of manufacture, a coiled clutch spring element wound from wire stock of uniform section having paired side faces which converge slightly and adjacent narrower paired side faces which converge at a considerably wider angle, the slightly converging side faces becoming approximately parallel and mutually adjacent to each other in the wound spring, and wherein a clutch-engaging surface is formed on each coil lying between the widely divergent sides, the clutch-engaging surface being narrow as compared to the mutually adjacent coil faces and to the average dimension of the stock axially of the coils, said clutch-engaging surface gradiently increasing in width, axially of the coils in a direction from one end of the element toward the other.

10. As an article of manufacture, a spring clutch element comprising a coiled, drawn or rolled wire of bi-symmetrical elongated generally hexagonal form, the coils having mutually adjacent approximately parallel faces, and converging faces connected by a clutching face which is narrower axially of the coil than the non-clutching face lying radially opposite the clutching face and narrower than the mutually adjacent faces of adjacent coils.

11. A helical torque-transmitting member whereof the individual coils of the wire from which the member is made are uniformly of keystone section by reason of having somewhat non-parallel main sides and having, in addition, paired approximately straight sides converging at a relatively wide angle as compared to the keystone-forming sides and being connected by a curved surface portion peripherally of the member, the approximate center of the curve lying between said wide angle sides and beyond the region which is situated between the keystone-forming sides in a direction toward the midpoint of the curve.

WILLIAM CARLETON STARKEY.
HAMILTON L. McCORMICK.

REFERENCES CITED

The following references are of record in the file of this patent:

UNITED STATES PATENTS

| Number | Name | Date |
|---|---|---|
| 2,043,695 | Brownlee | June 9, 1936 |
| 2,052,961 | Bonham | Sept. 1, 1936 |
| 2,336,757 | Starkey | Dec. 14, 1943 |